US012658796B2

(12) United States Patent
Nogawa

(10) Patent No.: US 12,658,796 B2
(45) Date of Patent: Jun. 16, 2026

(54) ELECTRONIC DEVICE AND CONTROL METHOD FOR THE SAME

(71) Applicant: CANON KABUSHIKI KAISHA, Tokyo (JP)

(72) Inventor: Yuki Nogawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 172 days.

(21) Appl. No.: 18/671,073

(22) Filed: May 22, 2024

(65) Prior Publication Data

US 2024/0405674 A1 Dec. 5, 2024

(30) Foreign Application Priority Data

May 29, 2023 (JP) ................................. 2023-088070

(51) Int. Cl.
H02M 3/156 (2006.01)
H02J 9/06 (2006.01)
H02M 1/00 (2007.01)

(52) U.S. Cl.
CPC ............. H02M 3/156 (2013.01); H02J 9/061 (2013.01)

(58) Field of Classification Search
CPC ............................. H02M 3/156; H02M 1/007
See application file for complete search history.

(56) References Cited

U.S. PATENT DOCUMENTS

| | | | | | |
|---|---|---|---|---|---|
| 11,460,871 | B2 * | 10/2022 | Togashi | .................... | G05F 1/12 |
| 11,545,896 | B1 * | 1/2023 | Zhang | ...................... | H02M 3/07 |
| 2016/0202743 | A1 * | 7/2016 | Li | ........................... | G06F 1/263 |
| | | | | | 710/313 |
| 2016/0282931 | A1 * | 9/2016 | Hagiwara | ................. | G06F 3/12 |
| 2021/0218332 | A1 * | 7/2021 | Sakamoto | ............... | H02J 1/084 |
| 2021/0399650 | A1 * | 12/2021 | Ujimaru | .............. | H02M 1/0032 |
| 2022/0103006 | A1 * | 3/2022 | Inai | ......................... | G05F 1/625 |
| 2024/0283358 | A1 * | 8/2024 | Takahashi | ............... | H02M 3/04 |
| 2025/0350865 | A1 * | 11/2025 | Tsujimoto | .............. | H04N 23/65 |

FOREIGN PATENT DOCUMENTS

JP        2001166854 A        6/2001

* cited by examiner

*Primary Examiner* — Sisay G Tiku
(74) *Attorney, Agent, or Firm* — Cowan, Liebowitz & Latman, P.C.

(57) ABSTRACT

An electronic device comprises a first converter circuit converting an input voltage from a first or second power source to a first output voltage being 1/n of the input voltage (n>=2); a second converter circuit converting the input voltage from the second power source to a second output voltage; and a third converter circuit converting a higher one of the first and second output voltages to a third output voltage to be supplied to a load. The device, if the input voltage from the first power source is supplied to the first converter circuit, sets the second output voltage to be higher than a currently set voltage and lower than 1/n of the input voltage. The device then performs control to supply the input voltage from the first power source to the first converter circuit.

14 Claims, 3 Drawing Sheets

ELECTRONIC DEVICE AND CONTROL METHOD FOR THE SAME

BACKGROUND OF THE INVENTION

Field of the Invention

The present invention relates to an electronic device and a control method for the same.

Description of the Related Art

In order to realize stable operation of an electronic device capable of using different power sources such as an interface capable of supplying power, a battery, and an AC adapter, the function of dynamically switching the power source to be used has been proposed (Japanese Patent Laid-Open No. 2001-166854).

According to Japanese Patent Laid-Open No. 2001-166854, when the power consumption of the electronic device exceeds the power that can be supplied through the interface, the operation of the electronic device is maintained by supplying power from the battery. However, when the power source is switched, if the voltage supplied from the power source changes suddenly, malfunction or deterioration of processing quality may be caused. Japanese Patent Laid-Open No. 2001-166854 does not take such voltage fluctuations into account at all.

SUMMARY OF THE INVENTION

In view of such a problem of the prior art, one embodiment of the present invention provides an electronic device and a control method for the same capable of reducing fluctuations of the supply voltage when switching the power source to be used.

According to an aspect of the present invention, there is provided an electronic device comprising: a first voltage converter circuit that converts an input voltage from a first power source or a second power source to a first output voltage, the first output voltage being 1/n of the input voltage, where n is an integer greater than or equal to 2; a second voltage converter circuit that converts the input voltage from the second power source to a second output voltage; a third voltage converter circuit that converts a higher one of the first output voltage and the second output voltage to a third output voltage, and supplies the third output voltage to a load; and one or more processors or circuits that cause the electronic device to function as: a control unit that sets the second output voltage of the second voltage converter circuit, wherein the second voltage converter circuit outputs the second output voltage set by the control unit, wherein the control unit: in a case where the input voltage from the first power source is to be supplied to the first voltage converter circuit, sets the second output voltage to a first voltage that is higher than a currently set voltage and lower than 1/n of the input voltage from the first power source, and after setting the second output voltage to the first voltage, performs control to supply the input voltage from the first power source to the first voltage converter circuit.

According to another aspect of the present invention, there is provided a control method that is carried out by an electronic device that includes: a first voltage converter circuit that converts an input voltage from a first power source or a second power source to a first output voltage, the first output voltage being 1/n of the input voltage, where n is an integer greater than or equal to 2; a second voltage converter circuit that converts the input voltage from the second power source to a second output voltage; a third voltage converter circuit that converts a higher one of the first output voltage and the second output voltage to a third output voltage, and supplies the third output voltage to a load; and the control method comprising: in a case where the input voltage from the first power source is to be supplied to the first voltage converter circuit, setting the second output voltage to a first voltage that is higher than a currently set voltage and lower than 1/n of the input voltage from the first power source, and after setting the second output voltage to the first voltage, performing control to supply the input voltage from the first power source to the first voltage converter circuit.

According to a further aspect of the present invention, there is provided a non-transitory computer-readable medium that stores a program that causes, when executed by a computer included in an electronic device to perform a control method, wherein the electronic device includes: a first voltage converter circuit that converts an input voltage from a first power source or a second power source to a first output voltage, the first output voltage being 1/n of the input voltage, where n is an integer greater than or equal to 2; a second voltage converter circuit that converts the input voltage from the second power source to a second output voltage; a third voltage converter circuit that converts a higher one of the first output voltage and the second output voltage to a third output voltage, and supplies the third output voltage to a load; and wherein the control method comprising: in a case where the input voltage from the first power source is to be supplied to the first voltage converter circuit, setting the second output voltage to a first voltage that is higher than a currently set voltage and lower than 1/n of the input voltage from the first power source, and after setting the second output voltage to the first voltage, performing control to supply the input voltage from the first power source to the first voltage converter circuit.

Further features of the present invention will become apparent from the following description of exemplary embodiments (with reference to the attached drawings).

DESCRIPTION OF THE EMBODIMENTS

Figure 1:
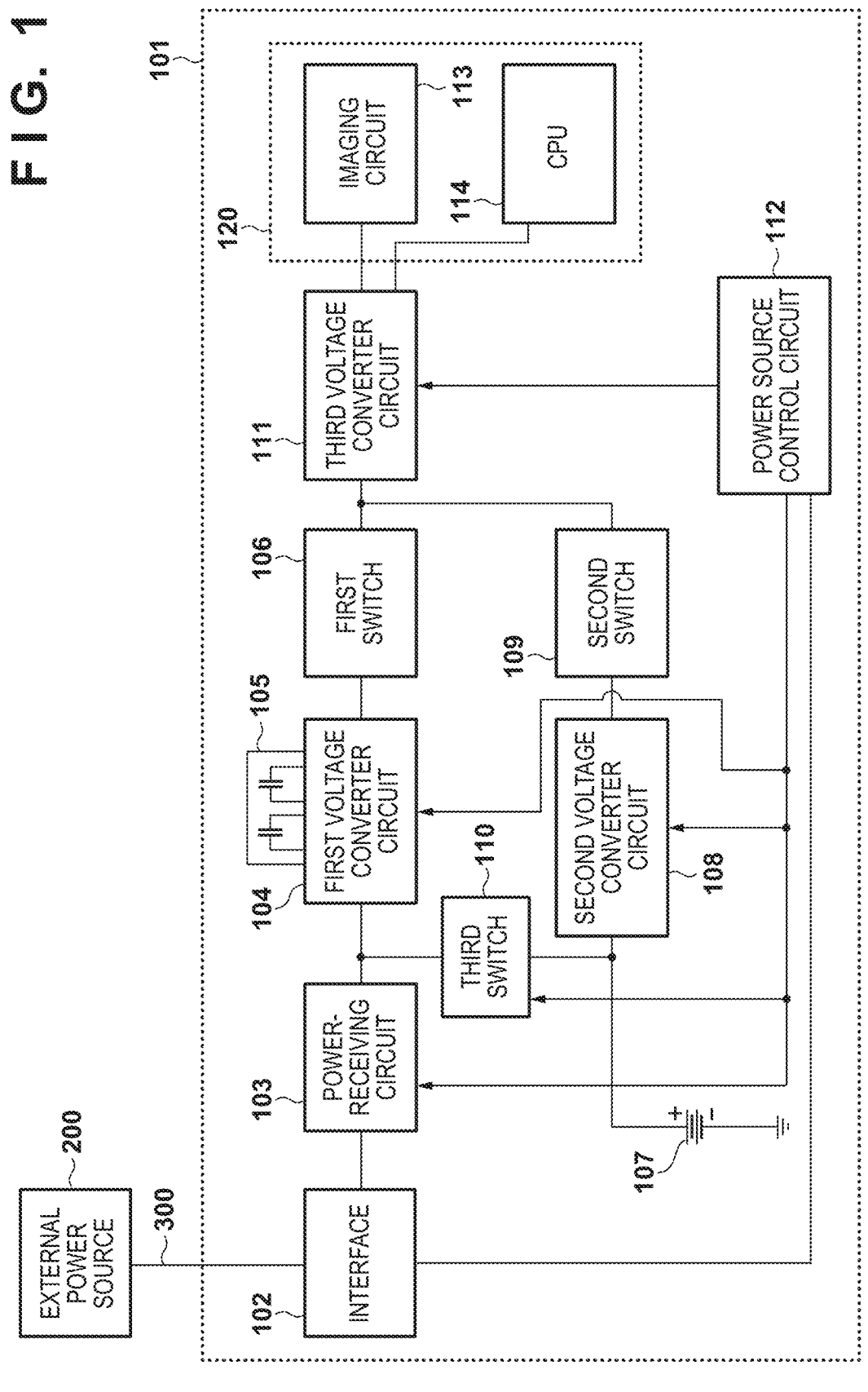
FIG. 1 is a block diagram showing an example of a functional configuration of an imaging device, which is an example of an electronic device according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that the following embodiment describes a case in which the present invention is implemented in an imaging device (digital camera). However, the imaging function is not essential to the present invention, and the present invention can be implemented in any electronic device capable of using a plurality of types of power sources while dynamically switching between them. Examples of such electronic devices include video cameras, computer devices (personal computers, tablet computers, media players, PDAs, etc.), mobile phones, smartphones, game machines, robots, drones, and drive recorders. These are merely examples, and the present invention can be implemented in other electronic devices.

FIG. 1 is a block diagram showing an example of a functional configuration of an imaging device 101, which is an example of an electronic device according to the present invention. Note that FIG. 1 mainly shows a functional configuration related to power supply, and only partially shows other functional configurations.

The imaging device 101 is capable of using a plurality of power sources while dynamically switching between them. Here, it is assumed that an external power source 200 connected to an interface 102 and a battery 107 can be used as power sources. However, there are no particular restrictions on the number (two or more) and types of power sources. For example, the battery 107 may be in a form that can be easily attached to and removed from the imaging device 101 by the user (for example, a battery pack), or in a form that cannot be attached to or removed from the imaging device 101 by the user.

The interface 102 is, for example, an interface capable of supplying power from an external device connected to the imaging device 101, such as a USB interface. Therefore, the imaging device 101 is capable of receiving, through the interface 102, the power supply determined by the specifications of the interface 102 and the specifications of the external device connected to the interface 102.

Here, it is assumed that the external device connected to the interface 102 via a cable 300 is the external power source 200, which is as an AC adapter, a portable battery, or the like. However, the external device does not have to be a power source. Hereinafter, power supply through the interface 102 will be referred to as external power supply.

A power-receiving circuit 103 outputs the voltage supplied through the interface 102 without converting it (through output). The power-receiving circuit 103 may include a load switch. In addition, the power-receiving circuit 103 has the function of limiting the current (electric current) flowing via the interface 102 to an upper limit value determined by the standard adopted for the interface 102, for example. Note that the function of limiting the current flowing via the interface 102 may be provided by an external device (here, the external power source 200) connected to the interface 102.

The battery 107 is, for example, a battery pack that can be attached to and removed from the imaging device 101 by the user. The battery 107 has a maximum output voltage depending on the configuration thereof. The output voltage of the battery 107 varies depending on the state of the battery 107. In the present embodiment, the battery 107 is a rechargeable lithium-ion battery, includes two lithium-ion cells, and the output voltage of the battery 107 varies between 8.4 V (when fully charged) and 5.0 V depending on the state of charge. The output voltage of the battery 107 is input to a third switch 110 and a second voltage converter circuit 108.

The third switch 110 is provided between the connection path between the power-receiving circuit 103 and a first voltage converter circuit 104 and the output of the battery 107. When the third switch 110 is ON, the output voltage of the battery 107 is applied to the connection path through the third switch 110. When the third switch 110 is OFF, the output voltage of the battery 107 is not applied to the connection path.

When the imaging device 101 is not supplied with power from the external power source 200 via the interface 102 and the imaging device 101 is to be powered by the battery 107, the third switch 110 is turned on. As a result, the output voltage of the battery 107 is input to both the first voltage converter circuit 104 and the second voltage converter circuit 108. When the imaging device 101 is supplied with power from the external power source 200 via the interface 102, the third switch 110 is turned off. ON and OFF of the third switch 110 is controlled by a power source control circuit 112.

The imaging device 101 includes the first voltage converter circuit 104, the second voltage converter circuit 108, and a third voltage converter circuit 111. Whichever of the respective output voltages of the first voltage converter circuit 104 and the second voltage converter circuit 108 is higher is input to the third voltage converter circuit 111. Note that the range of input voltages allowed by the third voltage converter circuit 111 includes the normal range that the output voltages of the first voltage converter circuit 104 and the second voltage converter circuit 108 can take.

The first voltage converter circuit 104 has higher efficiency of voltage conversion than the second voltage converter circuit 108. There is no restriction on the method for satisfying such a relationship of an efficiency of voltage conversion. Here, it is assumed that the first voltage converter circuit 104 and the second voltage converter circuit 108 use different voltage conversion methods. Specifically, the first voltage converter circuit 104 is a switched capacitor converter, and the second voltage converter circuit 108 is a switching DC-to-DC converter.

The ratio of the output voltage to the input voltage of a switched capacitor converter is an integer. Therefore, the output voltage of the first voltage converter circuit 104 is n times or 1/n times the input voltage thereof (n is an integer greater than or equal to 2). In the present embodiment, the first voltage converter circuit 104 is used as a step-down circuit, and two flying capacitors 105 are used to halve the input voltage to obtain the output voltage.

The second voltage converter circuit 108 converts the input voltage supplied from the battery 107 to an output voltage that is in accordance with a set value. The second voltage converter circuit 108 is not a switched capacitor converter. The output voltage of the second voltage converter circuit 108 is not limited to n times or 1/n times the input voltage (n is an integer greater than or equal to 2) and is able to be set a value other than n times or 1/n times the input voltage. The output voltage of the second voltage converter circuit 108 is set by the power source control circuit 112.

The first voltage converter circuit 104 is connected to the third voltage converter circuit 111 via a first switch 106. The second voltage converter circuit 108 is connected to the third voltage converter circuit 111 via a second switch 109. The outputs of the first switch 106 and the second switch 109 are connected to a point before the third voltage converter circuit 111. The first switch 106 and the second switch 109 are examples of circuits that prevent backflow to the first voltage converter circuit 104 and the second voltage converter circuit 108, respectively.

For example, the first switch 106 and the second switch 109 may each be a diode whose cathode is connected to the third voltage converter circuit 111, or may be a load switch. When the first switch 106 and the second switch 109 are realized as load switches, they may be configured to turn on when a voltage is applied from an upstream voltage converter circuit and to prevent backflow when in the ON state. When load switches are used, conduction loss can be reduced compared to when diodes are used. Alternatively, the first switch 106 and the second switch 109 may be realized using semiconductor devices called "ideal diodes".

Therefore, whichever of the respective output voltages of the first voltage converter circuit 104 and the second voltage converter circuit 108 is higher is input to the third voltage converter circuit 111. When the imaging device 101 is powered by the battery 107, the output voltage of the second voltage converter circuit 108 is set to a value close to and above the lower limit value of the voltage range in which the third voltage converter circuit 111 can operate. For example, the output voltage of the second voltage converter circuit 108 is set to a voltage that is higher by a predetermined value than the lower limit value of the voltage range in which the third voltage converter circuit 111 can operate. As a result, when the output voltage of the battery 107 is high and the output voltage of the first voltage converter circuit 104 is higher than the output voltage of the second voltage converter circuit 108, the output voltage of the first voltage converter circuit 104 is output to the third voltage converter circuit 111. When the voltage of the battery 107 decreases and the output voltage of the first voltage converter circuit 104 becomes lower than the output voltage of the second voltage converter circuit 108, the third voltage converter circuit 111 is supplied with the output voltage from the second voltage converter circuit 108. As described above, the output voltage of the second voltage converter circuit 108 is a voltage within the voltage range in which the third voltage converter circuit 111.

As a result, when the output voltage of the battery 107 is high, the first voltage converter circuit 104, which achieves high voltage conversion efficiency, is used. Therefore, the power consumption of the imaging device 101 can be reduced. When the output voltage of the battery 107 decreases and the output voltage of the first voltage converter circuit 104 becomes lower than the voltage range in which the third voltage converter circuit 111 can operate, the output voltage of the second voltage converter circuit 108 is supplied to the third voltage converter circuit 111, making it possible to maintain the operation of the imaging device 101.

The third voltage converter circuit 111 converts an input voltage within an allowable range to one or more types of output voltages necessary to operate various circuits included in a subsequent load 120 subsequent. The third voltage converter circuit 111 may be a switching DC-to-DC converter, for example. Although FIG. 1 shows an imaging circuit 113 and a CPU 114 as circuits included in the load 120, these are merely examples. Note that the power source control circuit 112 may also be included in the load 120.

The imaging circuit 113 converts a subject image formed by an imaging optical system of the imaging device 101, such as an image sensor, to an electrical signal or data for each pixel.

The CPU 114 performs overall control of the imaging device 101 by reading a program stored in the ROM into the RAM and executing the program.

The power source control circuit 112 is a one-chip microcomputer that includes at least one processor or circuit, such as a CPU, a ROM, or a RAM. The power source control circuit 112 controls the operations of the power-receiving circuit 103, the first voltage converter circuit 104, the second voltage converter circuit 108, the third voltage converter circuit 111, and the third switch 110. In addition, the power source control circuit 112 has the function of performing operations compliant with the standards to which the interface 102 complies, such as detecting whether or not an external device is connected to the interface 102 and communicating with an external device.

Next, specific operations of the above-described constituent elements will be described with further reference to FIGS. 2 and 3. In the following description it is assumed that The external power source 200 is a power supply device that complies with the USB Power Delivery standard (hereinafter referred to as the USB PD standard) and can supply 27 W (9.0 V, 3.0 A). The external power source is a source of the USB PD standard.

The allowable input voltage of the third voltage converter circuit 111 is 2.5 V to 5.5 V.

The output voltage of the battery 107 is 5.0 V.

The output voltage of the first voltage converter circuit 104 is half the input voltage thereof.

The initial set value of the output voltage of the second voltage converter circuit 108 is 2.6 V.

The imaging device 101 is compliant with the USB PD standard. The interface 102 is a USB interface that complies with the USB PD standard. The interface 102 has a USB Type-C connector. The imaging device 101 is a sink of the USB PD standard.

For convenience, it is assumed that the voltage conversion efficiency of each voltage converter circuit is 100%. As described above, the output voltage of the battery 107 fluctuates between 8.4V, which is the output voltage when fully charged, and 5.0 V but it is assumed here that the output voltage of the battery 107 is 5.0 V.

Figure 2:
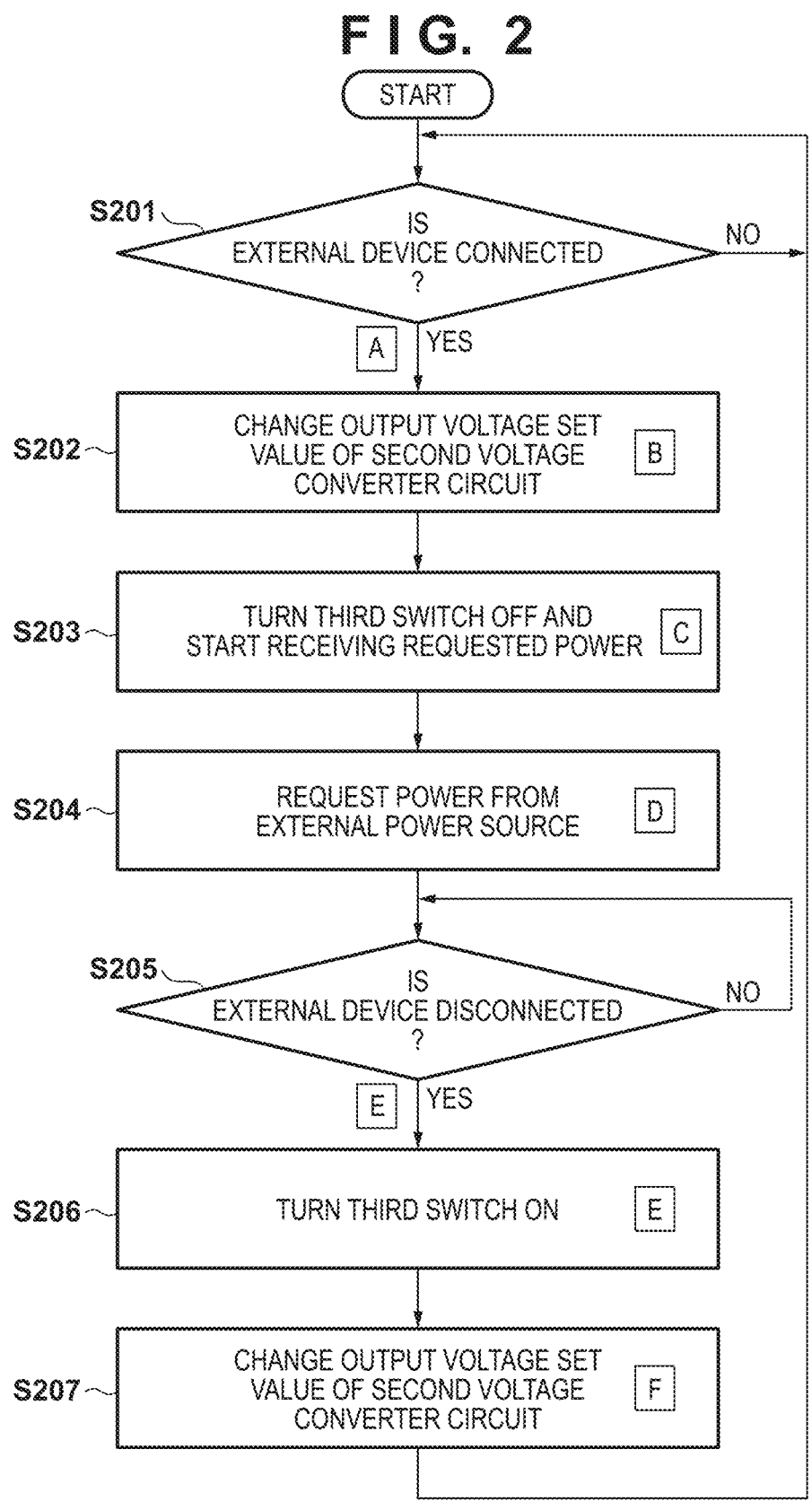
FIG. 2 is a flowchart for power source control operation according to the embodiment.
Figure 3:
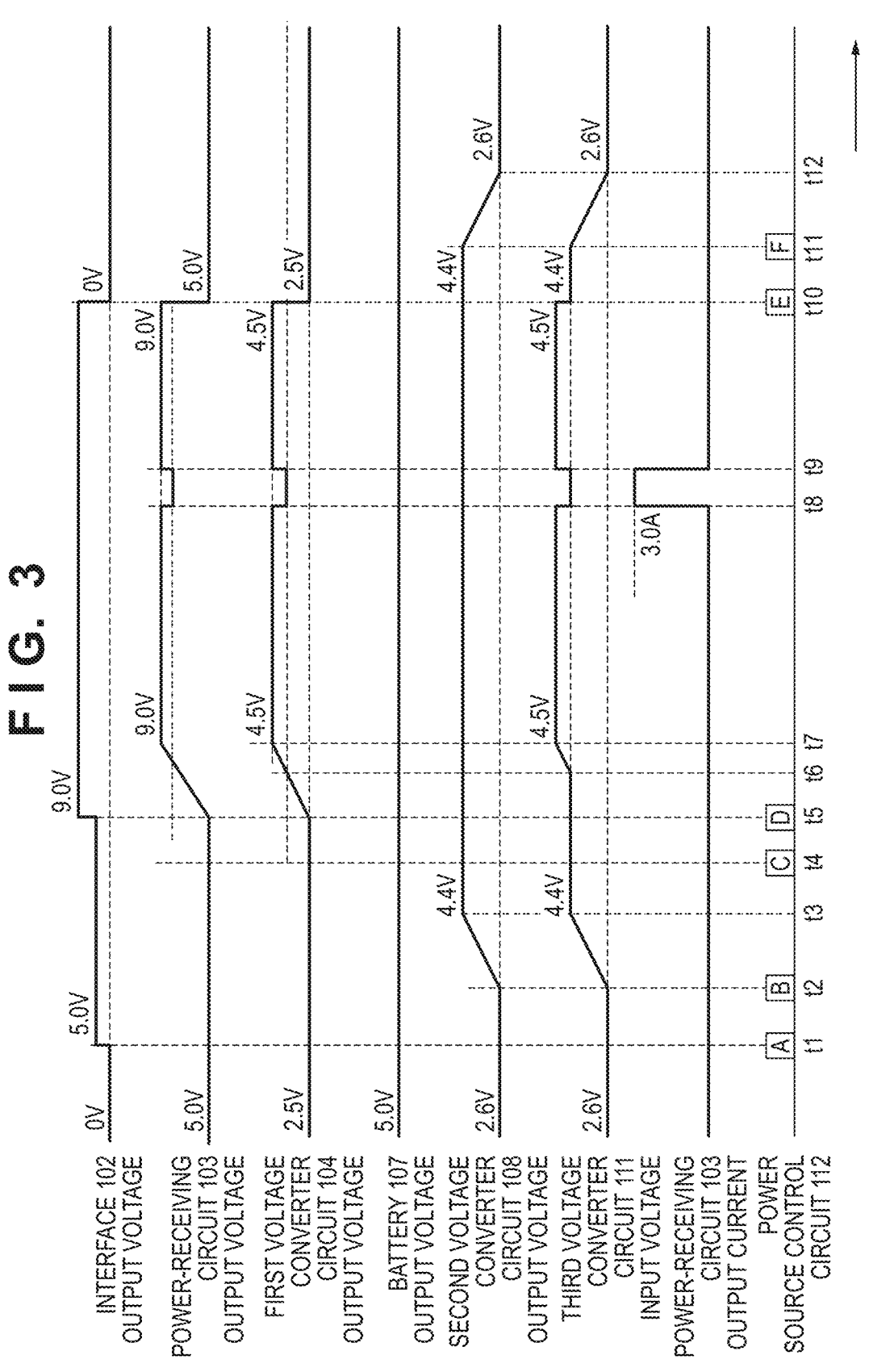
FIG. 3 is a timing chart for the power source control operation according to the embodiment.

FIG. 2 is a flowchart for the operations of the power source control circuit 112 according to the present embodiment, and FIG. 3 is a timing chart corresponding to FIG. 2. Note that the signs A to F in FIGS. 2 and 3 indicate corresponding timings. In this embodiment, when the external power source 200 is connected to the imaging device 101, the power source of the imaging device 101 is changed from the battery 107 to the external power source 200.

The operation shown in FIG. 2 is realized by the CPU included in the power source control circuit 112, which is a one-chip microcomputer, for example, loading a program stored in the built-in ROM into the built-in RAM and executing the program. In addition, the operation shown in FIG. 2 is started in a state where the external power source 200 is not connected to the interface 102 and the imaging device 101 is powered by the battery 107. In this state, the third switch 110 is ON, and the output voltage of the battery 107 is input to both the first voltage converter circuit 104 and the second voltage converter circuit 108.

The set value of the output voltage of the second voltage converter circuit 108 is such that the output voltage of the second voltage converter circuit 108 does not fall below the lower limit value of the allowable input voltage of the third voltage converter circuit 111, which is 2.5 V, even if a voltage drop occurs due to an increase in current when the power consumption of the load 120 increases. Here, the output voltage is set to 2.6 V, which is higher than the lower limit value of the allowable input voltage of the third voltage converter circuit 111 by 0.1 V (a predetermined value), but may be set to a higher value. However, if the set value is higher, the available capacity of the battery 107 decreases. Therefore, from the viewpoint of effective use of the battery 107, it is preferable that the set value is lower. In addition, the voltage conversion efficiency of the switching DC-to-DC converter is higher for a smaller difference between the input voltage and the output voltage. In the present embodiment, the output voltage of the third voltage converter circuit 111 is as low as about 0.5 V to 1.1 V. Therefore, also from the viewpoint of voltage conversion efficiency of the third voltage converter circuit 111, it is preferable that the set value of the output voltage of the second voltage converter circuit 108 is low.

Here, the output voltage of the battery 107 is 5.0 V at the start of operation, and therefore the output voltage of the first voltage converter circuit 104 is 2.5 V, which is half the input voltage of 5.0 V from the battery 107 (5.0 V/2). On the other hand, the output voltage of the second voltage converter circuit 108 is 2.6 V. Therefore, the output voltage of 2.6 V (>2.5 V) of the second voltage converter circuit 108 is input to the third voltage converter circuit 111.

In step S201, the power source control circuit 112 determines whether or not an external device is connected to the interface 102, and if it is determined that an external device is connected, the power source control circuit 112 performs step S202, and otherwise performs step S201 after a certain period of time, for example. The determination can be made in accordance with the standard to which the interface 102 complies. In the case of a USB interface, it is possible to determine whether or not an external device is connected, based on the voltage across the power supply terminals of the interface 102. When an external device is connected (time t1 in FIG. 3, timing A), the voltage across the power supply terminals of the interface 102 becomes 5.0 V according to the USB standard.

Note that when it is detected that an external device is connected to the interface 102, the power source control circuit 112 performs a negotiation communication defined in the USB PD standard with the connected external device via the interface 102. Through this negotiation, the power source control circuit 112 acquires information regarding the type and power supply capabilities of the external device (the external power source 200). As a result, the power source control circuit 112 recognizes that the external power source 200 connected to the interface 102 is a source device that complies with the USB PD standard and has a power supply capability of 27 W (9.0 V, 3.0 A). The power source control circuit determines power to be requested from the external power source among the power supply capabilities of the external power source 200. Note that it is assumed that the power to be requested from the external power source is set in advance in the power source control circuit 112. In the present embodiment, the power source control circuit 112 requests a voltage higher than the voltage of the battery 107 from the external power source 200 among the power supply capabilities of the external power source 200.

In step S202, the power source control circuit 112 changes the set value of the output voltage of the second voltage converter circuit 108 (time t2 in FIG. 3, timing B). Specifically, the power source control circuit 112 changes the set value of the output voltage of the second voltage converter circuit 108 to a value greater than the current value and less than the output voltage of the first voltage converter circuit 104 based on the voltage requested from the external power source 200 connected to the interface 102.

Here, it is requested that the external power source 200 should supply a power of 27 W (9.0 V, 3.0 A), the output voltage of the first voltage converter circuit 104 based on the required power is half the input voltage of 9 V from the external power source 200, which is 4.5 V. Therefore, the power source control circuit 112 changes the set value of the output voltage of the second voltage converter circuit 108 to a value (a first voltage). The first value is higher than 2.6 V and is lower than 4.5 V by a predetermined voltage (for example, about 0.1 V to 0.2 V). Here, as an example, it is assumed that the power source control circuit 112 changes the set value of the output voltage of the second voltage converter circuit 108 to 4.4 V.

The reason for changing the set value of the output voltage of the second voltage converter circuit 108 is to reduce fluctuations in the input voltage of the third voltage converter circuit 111 when the power source of the imaging device 101 is switched from the battery 107 to the external power source 200. For example, when the external power source 200 is connected to the interface 102 and 9 V, which is the voltage requested from the external power source 200, is supplied from the external power source 200, this voltage of 9 V is output to the first voltage converter circuit 104 via the power-receiving circuit 103. Thereafter, the first voltage converter circuit 104 outputs an output voltage of 4.5 V, which is half of 9 V. Therefore, if the external power source 200 is connected when the voltage of the battery 107 has dropped to nearly 5.0 V, the voltage input to the third voltage converter circuit 111 will change sharply from 2.6 V supplied from the second voltage converter circuit 108 to 4.5 V supplied from the first voltage converter circuit 104. Due to the sharp change in the voltage input to the third voltage converter circuit 111, the output voltage of the third voltage converter circuit 111 also changes sharply, which may affect the operation of the circuits included in the load 120.

The second voltage converter circuit 108 requires a longer time for a change in the set value (change in the input voltage) to be reflected in the output voltage than the first voltage converter circuit 104, which is a switched capacitor converter. Alternatively, the second voltage converter circuit 108 can control the time until a change in the set value is reflected in the output voltage by setting a slew rate or the like. Before switching the power source of the imaging device 101 from the battery 107 to the external power source 200, the output voltage of the second voltage converter circuit 108 is gradually increased (for example, in a period of about 1 ms) from 2.6V to 4.4V. As a result, the sharp fluctuations in the input voltage of the third voltage converter circuit 111 that occur when power supply is switched to that from the external power source 200 can be reduced.

Basically, the time required for the output voltage of the second voltage converter circuit 108 to reach 4.4 V from 2.6 V is set to be longer than the time required for the output voltage to reach 4.5 V when power from the external power source 200 is applied to the first voltage converter circuit 104.

Note that instead of changing the set value of the output voltage of the second voltage converter circuit 108 to 4.4 V at once, the set value may be changed gradually from 2.6 V to 4.4 V. In addition, the set value may be changed to a lower value such as 4.0 V.

At time t3 in FIG. 3, after the output voltage of the second voltage converter circuit 108 reaches 4.4 V corresponding to the set value that has been changed, the power source control circuit 112 performs step S203 (at time t4 in FIG. 3, timing C). In step S203, the power source control circuit 112 turns off the third switch 110. Note that, if the voltage of the battery 107 at time t3 is higher than 5.2 V, the input to the third voltage converter circuit 111 is changed from the output of the first voltage converter circuit 104 to the output voltage (4.4 V) of the second voltage converter circuit 108 between times t3 and t4.

In step S204, the power source control circuit 112 requests that the external power source 200 supply a power of 27 W (9.0 V, 3.0 A) through the interface 102. As a result, power supply from the external power source 200 is started in response to the request (t5 in FIG. 3, timing D). Note that, if the output of the power-receiving circuit 103 is disabled, the power source control circuit 112 enables the output of the power-receiving circuit 103 at this timing.

When the output voltage of the power-receiving circuit 103 exceeds 8.8 V at time t6, the output voltage of the first voltage converter circuit 104 becomes higher than 4.4 V and begins to be input to the third voltage converter circuit 111. Thereafter, at time t7, the output of the power-receiving circuit 103 reaches 9.0 V, and the output voltage of the first voltage converter circuit 104 reaches 4.5 V.

Thereafter, for example, if the power consumption of the load 120 exceeds 27 W at time t8, the power-receiving circuit 103 limits the current to 3.0 A, and therefore the output voltage of the first voltage converter circuit 104 decreases. When the output voltage of the first voltage converter circuit 104 falls below 4.4 V, the output voltage of the second voltage converter circuit 108, which is 4.4 V, is input to the third voltage converter circuit 111.

When the power consumption of the load 120 falls below 27 W at time t9, the output voltage of the first voltage converter circuit 104 returns to 4.5 V, and therefore the output voltage, 4.5 V, of the first voltage converter circuit 104 is now input to the third voltage converter circuit 111. In this way, even if the power consumption of the load 120 exceeds the power supplied from the external power source 200 via the interface 102, the input voltage of the third voltage converter circuit 111 can be maintained in the range of 4.4 V to 4.5 V by using the power of the battery 107.

In S205, the power source control circuit 112 determines whether the connected external device (external power source 200) has been disconnected from the interface 102. If it is determined that the external device has been disconnected, the power source control circuit 112 executes S206; if not, for example, Execute S205 after a certain period of time. When the external device is removed from the interface 102 (time t10 in FIG. 3, timing E), the voltage across the power supply terminals of the interface 102 changes to 0 V.

As a result, the output voltage of the first voltage converter circuit 104 becomes 0 V, and therefore, the output voltage of the second voltage converter circuit 108, which is 4.4 V, is now input to the third voltage converter circuit 111.

In step S206, the power source control circuit 112 turns on the third switch 110. As a result, the output voltage of the battery 107 is also input to the first voltage converter circuit 104. However, even when the battery 107 is fully charged (8.4V), the output voltage of the first voltage converter circuit 104 is 4.2 V, and therefore, the output voltage, 4.4 V, of the second voltage converter circuit 108 is continuously supplied to the third voltage converter circuit 111.

In addition, the power source control circuit 112 changes the set value of the output voltage of the second voltage converter circuit 108 from 4.4 V to 2.6 V (t11 in FIG. 3, timing F). If necessary, the power source control circuit 112 may change the setting for the second voltage converter circuit 108 so that the output voltage of the second voltage converter circuit 108 changes so as to decrease gradually (for example, in a period of about 1 ms). Note that instead of changing the set value of the output voltage of the second voltage converter circuit 108 from 4.4 V to 2.6 V at once, the set value may be changed gradually from 4.4 V to 2.6 V.

At time t12 in FIG. 3, the output voltage of the second voltage converter circuit 108 becomes 2.6 V. Note that, if the voltage of the battery 107 at time t11 is higher than 5.2 V, the input to the third voltage converter circuit 111 is changed from the output of the second voltage converter circuit 108 to the output voltage of the first voltage converter circuit 104 between times t11 and t12.

As described above, according to the present embodiment, when switching between power sources, the voltage supplied by the current power source is changed so as not to cause large fluctuations in the supply voltage, and thereafter the power sources are switched. Therefore, even if there is a large difference between the voltages of the power sources before and after switching, malfunctions or the like of the devices can be reduced.

OTHER EMBODIMENTS

In the above-described embodiment, even if the change in the input voltage of the third voltage converter circuit 111 is sufficiently small (for example, the voltage of the battery 107 is greater than or equal to a threshold value) after the power source is switched from the battery 107 to the external power source 200, the operations in steps S202 and S203 may be skipped.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-088070, filed May 29, 2023, which is hereby incorporated by reference herein in its entirety.

What is claimed is:

1. An electronic device comprising: a first voltage converter circuit that converts an input voltage from a first power source or a second power source to a first output voltage, the first output voltage being 1/n of the input voltage, where n is an integer greater than or equal to 2; a second voltage converter circuit that converts the input voltage from the second power source to a second output voltage; a third voltage converter circuit that converts a higher one of the first output voltage and the second output voltage to a third output voltage, and supplies the third output voltage to a load; and one or more processors or circuits that cause the electronic device to function as: a control unit that sets the second output voltage of the second voltage converter circuit, wherein the second voltage converter circuit outputs the second output voltage set by the control unit, wherein the control unit: in a case where the input voltage from the first power source is to be supplied to the first voltage converter circuit, sets the second output voltage to a first voltage that is higher than a currently set voltage and lower than 1/n of the input voltage from the first power source, and after setting the second output voltage to the first voltage, performs control to supply the input voltage from the first power source to the first voltage converter circuit, wherein the control unit performs a control such that the input voltage from the second power source is supplied to the first voltage converter circuit and the second voltage converter circuit in a case where the first power source is not connected to the electronic device, and the input voltage from the second power source is supplied to the second voltage converter circuit and the input voltage of the first voltage converter circuit is switched from the input voltage from the second power source to the input voltage from the first power source in a case where it is detected that the first power source is connected to the electronic device.

2. The electronic device according to claim 1,
   wherein the first power source is an external power source which can be connected to the electronic device and the second power source is a battery installed in the electronic device.

3. The electronic device according to claim 2, wherein
   the control unit performs control so that the second output voltage becomes a second voltage that is higher by a predetermined value than a lower limit value of an operable voltage range of the third voltage converter circuit in a case where the first power source is not connected to the electronic device, and
   the control unit controls the second voltage converter circuit so that the second output voltage changes from the second voltage to the first voltage in a case where it is detected that the first power source is connected to the electronic device.

4. The electronic device according to claim 3,
   wherein the electronic device receives power from the first power source in a manner compliant with a USB Power Delivery standard, and
   wherein the control unit requests a higher voltage that is higher than a voltage of the battery of fully charged, from the first power source in the case where it is detected that the first power source is connected to the electronic device.

5. The electronic device according to claim 4,
   wherein the control unit performs control so as to request the higher voltage from the first power source after the second output voltage becomes the first voltage.

6. The electronic device according to claim 5,
   wherein the first voltage is lower than 1/n of the input voltage from the first power source by a predetermined voltage.

7. The electronic device according to claim 1, wherein the one or more processors or circuits further causes the electronic device to function as: a switch provided between the second power source and the first voltage converter circuit, wherein the input voltage from the second power source is supplied to the first voltage converter circuit in a case where the switch is on, and the input voltage from the second power source is not supplied to the first voltage converter circuit in a case where the switch is off, and the control unit turns on the switch in a case where the first power source is not connected to the electronic device, and turns off the switch in a case where the first power source is connected to the electronic device.

8. The electronic device according to claim 1,
   wherein the first voltage converter circuit has a higher voltage conversion efficiency than the second voltage converter circuit.

9. The electronic device according to claim 8,
   wherein the first voltage converter circuit is a switched capacitor converter.

10. The electronic device according to claim 1,
    wherein the input voltage from the first power source is higher than the input voltage from the second power source.

11. The electronic device according to claim 1,
    wherein the control unit changes the second output voltage to the first voltage by gradually changing the setting of the second output voltage.

12. The electronic device according to claim 1,
    wherein the control unit controls the second voltage converter circuit so that a period of time in which the second output voltage changes from the currently set voltage to the first voltage is longer than a period of time from when the input voltage from the first power source is supplied to the first voltage converter circuit to when the first output voltage changes to 1/n of the input voltage from the first power source.

13. A control method that is carried out by an electronic device that includes:
    a first voltage converter circuit that converts an input voltage from a first power source or a second power source to a first output voltage, the first output voltage being 1/n of the input voltage, where n is an integer greater than or equal to 2;
    a second voltage converter circuit that converts the input voltage from the second power source to a second output voltage;
    a third voltage converter circuit that converts a higher one of the first output voltage and the second output voltage to a third output voltage, and supplies the third output voltage to a load; and
    the control method comprising:
        in a case where the input voltage from the first power source is to be supplied to the first voltage converter circuit, setting the second output voltage to a first voltage that is higher than a currently set voltage and lower than 1/n of the input voltage from the first power source, and
        after setting the second output voltage to the first voltage, performing control to supply the input voltage from the first power source to the first voltage converter circuit, and
        performing a control such that the input voltage from the second power source is supplied to the first voltage converter circuit and the second voltage converter circuit in a case where the first power source is not connected to the electronic device, and the input voltage from the second power source is supplied to the second voltage converter circuit and the input voltage of the first voltage converter circuit is switched from the input voltage from the second power source to the input voltage from the first power source in a case where it is detected that the first power source is connected to the electronic device.

14. A non-transitory computer-readable medium that stores a program that causes, when executed by a computer included in an electronic device to perform a control method, wherein the electronic device includes:

a first voltage converter circuit that converts an input voltage from a first power source or a second power source to a first output voltage, the first output voltage being 1/n of the input voltage, where n is an integer greater than or equal to 2;

a second voltage converter circuit that converts the input voltage from the second power source to a second output voltage;

a third voltage converter circuit that converts a higher one of the first output voltage and the second output voltage to a third output voltage, and supplies the third output voltage to a load; and wherein the control method comprising:

in a case where the input voltage from the first power source is to be supplied to the first voltage converter circuit, setting the second output voltage to a first voltage that is higher than a currently set voltage and lower than 1/n of the input voltage from the first power source, after setting the second output voltage to the first voltage, performing control to supply the input voltage from the first power source to the first voltage converter circuit, and performing a control such that the input voltage from the second power source is supplied to the first voltage converter circuit and the second voltage converter circuit in a case where the first power source is not connected to the electronic device, and the input voltage from the second power source is supplied to the second voltage converter circuit and the input voltage of the first voltage converter circuit is switched from the input voltage from the second power source to the input voltage from the first power source in a case where it is detected that the first power source is connected to the electronic device.

* * * * *